United States Patent Office 3,225,084
Patented Dec. 21, 1965

3,225,084
PROCESS FOR PREPARING 1,4-ENDOALKYLENE-Δ⁵-CYCLOHEXENE-2,3-TRANS-DICARBOXYLIC ESTERS
Heinrich Koch, Vienna, Austria, assignor to F. Joh. Kwizda-Chem. Fabrik, Vienna, Austria, a corporation of Austria
No Drawing. Filed Aug. 7, 1962, Ser. No. 215,278
Claims priority, application Austria, Apr. 10, 1962,
A 2,984/62
3 Claims. (Cl. 260—468)

This invention relates to 1,4-endoalkylene-Δ⁵-cyclohexene-2,3-transdicarboxylic esters. In particular, the invention is concerned with an improved process of preparing such esters wherein the carboxylic groups are in trans-position to each other.

Dicarboxylic acids of said structure are theoretically formed by the 1,4 addition (diene synthesis) of cycloalkadienes at the double bond of fumaric acid. This procedure involves difficulties in practice. Adler and Stein, "Justus Liebig's Annalen der Chemie," vol. 514, page 203, have found that even cyclopentadiene, which is one of the most reactive dienes, cannot be added on fumaric acid. They have replaced free fumaric acid by its chloride although its reaction for diene synthesis requires special precautions. Whereas the trans-dicarboxylic acids may also be made from the readily obtainable cis-compounds, the rearrangement always requires a plurality of reaction stages, which involve a loss of matter. Adducts of fumaric acid derivatives on cycloalkadienes have been obtained later by direct synthesis (cf. British Patent No. 578,867) but this required extremely high working temperatures because the dimer (dicyclopendiene) rather than the monomer of the diene had to be used as starting material. The use of elevated reaction temperatures complicates the process not only from the technological aspect (need for special equipment, heating equipment, use of high-boiling solvents, increased fire risk) but reduces also the yields because decomposition reactions are promoted by increasing temperatures. Where bicyclic compounds of the present structural type are used, elevated temperatures may result in rearrangements which may affect the stereochemical uniformity of the product.

It is an object of the invention to provide an improved process for preparing esters of the above type under more convenient operating conditions and leading to higher yields of trans-adducts. Another object of the invention is to provide by such a process compounds of the above-mentioned type which are suitably substituted, especially halogenated and which have not yet been described in the art. A further object of the invention is to provide highly active pesticidal compositions containing 1,4-endoalkylene-Δ⁵-cyclohexene-2,3-trans-dicarboxylic esters as an active ingredient.

It has now been found that the trans-adducts can be obtained from cycloalkadiene monomers under much more convenient operating conditions and with higher yields if the dienes are reacted with fumaric esters at a temperature which is as low as possible and does not exceed the boiling temperature of the diene monomer. Fumaric esters do not have the disadvantages of the chloride of fumaric acid and are much more reactive than free fumaric acid. As distinguished from the chloride of fumaric acid, extreme cooling, dilution and exclusion of moisture are not required, nor are excessive reaction temperatures as are required for diene syntheses with the free fumaric acid.

Fumaric esters can also be added on suitably substituted, particularly polyhalogenated cycloalkadienes. As the last-mentioned adducts were not known before, the process enables the production of various polyhalogenated derivatives of bicyclo-(2,2,1)-heptene having substituents in trans positions at carbon atoms 2 and 3.

Examples of suitable starting diene monomers are cyclopentadiene and cyclohexadiene and their substituted, preferably chlorinated or brominated derivatives. The hydrogens of the alkylene bridge may also be substituted, e.g., by halogen or by hydroxy or alkoxy groups and the like or both of these hydrogens may be replaced by an oxygen or sulfur atom. The preferred starting dienes are the more highly chlorinated compounds, such as tetra-, penta- or hexachloropentadienes or -hexadienes or mixtures thereof.

A great variety of fumaric esters may be used as the other reactant. The radicals R in the general formula of a fumaric diester $C_2H_2(COOR)_2$ may be alkyl, cycloalkyl or aryl groups, which may be substituted, if desired. The dimethyl and diethyl esters are preferred.

The products of the invention may be used as plasticizers and solvents and as intermediates for the manufacture of plastic and resinous products, perfumes and pharmaceutical products. They can be incorporated in plastic compositions to render the same non-inflammable.

It has also been found that the compounds according to the invention, particularly the new halogenated esters, are excellently suitable for killing and repelling insects, small animals and fungi. For this reason, the invention includes also the use as a pesticide of compounds having the general formula

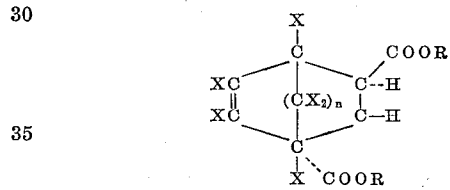

wherein X denotes hydrogen or a halogen, R denotes a substituted or unsubstituted alkyl radical, cycloalkyl radical or aryl radical and $n$ is 1 or 2 said compounds being preferably in combination with solid and/or liquid, inert diluents or dispersing agents.

Compositions according to the invention which contain non-halogenated compounds of the above formula have a pronounced repelling action on insects. They may be applied as cosmetic compositions to portions of the body for protection from gnats, flies, horseflies and the like.

Those compositions which contain halogenated compounds serve mainly as plant protecting and pest control agents. They may be applied to wood, textiles, masonry etc. to form a coating which will kill insects upon contact therewith.

Combinations of halogenated and non-halogenated compounds may be used in the same or similar way.

The active substance or the mixture of active substances may be used, e.g., in the form of a solution in a suitable solvent, such as ether, alcohol, mineral spirits, mineral oil and/or a mineral oil distillate and substances preventing a settling of the active matter from the solution may be added, if desired.

Such solutions may be admixed with emulsifiers, wetting agents or other surfactants in suitable form and with adhesion-promoting agents, if desired, so that an appropriate dilution with water will result in emulsions which can be sprayed or squirted with suitable implements onto plants which are to be protected from insects by the resulting coating.

Highly effective preparations are also obtained when the active substances are reduced to a finely divided state together with mineral or other inorganic and/or organic vehicles, such as lime, kaolin, diatomaceous earth, salts, chalk, colloidal silica etc., and the resulting product is dusted by suitable known devices on the plants to be protected. The resulting covering will destroy the insects which have infested or may infest the plants.

These mixtures may be mixed together with suitable detergents, emulsifiers, dispersing agents, thickeners and adhesives as well as protective colloids to form spray liquors which can be suspended in water and used for an effective protection of plants.

In another embodiment, the active substances are admixed with suitable substances, such as spruce wood meal, salts and the like, which have previously been mixed in finely divided form with oxygen-releasing substances and are filled into closed cans or boxes or sheet metal, cardboard or the like and caused to smolder with the aid of suitable fuses or wicks. The resulting smoke is allowed to be carried by the wind onto the forests or fields to be protected and will protect the same by destroying the insects reached by the smoke cloud.

The active substances may also be combined with fertilizers of the phosphate, potassium or nitrogen type or with suitable mixtures of these fertilizers so that it can be applied in a single operation as an insecticide and fungicide, on the one hand, and as a fertilizer, on the other hand.

The subsequent examples illustrate the process according to the invention and the use of the resulting products in making pest control agents. The application of the invention is not restricted, however, to these examples.

*Example 1*

60 grams dimethyl fumarate are suspended in three to four times its weight of an inert solvent and 30 grams freshly distilled cyclopentadiene are added to the suspension. After a few minutes, the mixture undergoes a slight temperature rise and the ester enters into solution. After standing for 24 hours the solvent is distilled off and the residue is rectified in vacuo. The adduct boils at 96–98° C./0.2 mm.

Yield: 84 grams. $d_4^{20}$: 1.1656. Calculated: 29.33% $OCH_3$. Found: 29.31% $OCH_3$.

If the dimethyl fumarate is replaced by 40 grams diethyl fumarate, the corresponding adduct is obtained boiling at 102–104° C./0.1 mm. Yield: 52 grams. $d_4^{20}$: 1.0940. Calculated: 37.82% $OC_2H_5$. Found: 37.79% $OC_2H_5$.

*Example 2*

30 grams dimethyl fumarate are boiled under reflex for 24 hours with five times its weight of cyclohexadiene-1,3. The residue obtained after the surplus cyclohexadiene has been distilled off is rectified in vacuo. The adduct boils at 116° C./0.4 mm. Yield: 42.5 grams. $d_4^{20}$: 1.1581. Calculated: 27.68% $OCH_3$. Found: 27.49% $OHC_3$.

If the dimethyl fumarate is replaced by 35 grams diethyl fumarate, the corresponding adduct is obtained boiling at 122–124° C./0.5 mm. Yield: 45.5 grams. $d_4^{20}$: 1.0945. Calculated: 35.72% $OC_2H_5$. Found: 35.05% $OC_2H_5$.

*Example 3*

3 grams dimethyl fumarate, 6 grams hexachloropentadiene and 3 milliliters xylene are heated for 24 hours under reflux, followed by fractionating in vacuo. The adduct boils at 155–160° C./0.4 mm. It is a viscous, yellow oil, $d_4^{20}$: 1.5788. Yield: More than 90%.

Calculated: 14.89% $OCH_3$, 51.03% Cl. Found: 14.56% $OCH_3$, 49.75% Cl.

*Example 4*

3.5 grams diethyl fumarate and 6 grams hexochlorocyclopentadiene are heated for 24 hours under reflux. The adduct boils at 158–162° C./0.2 mm. It is a yellow oil, $d_4^{20}$: 1.4759. Yield: 7.9 grams.

Calculated: 20.25% $OC_2H_5$, 47.81% Cl. Found: 20.30% $OC_2H_5$, 45.24% Cl.

*Example 5*

3 grams dimethyl fumarate are heated for 24 hours under reflux with 5.5 grams of a chlorination product of cyclopentadiene, which chlorination product boils below the hexachloro compound (i.e., tetra- and pentachlorocyclopentadiene). The adduct boils at 185–190° C./12 mm. and solidifies to a crystal mass. Recrystallization from petrol ether gives white crystals having a melting point of 92–94° C.

Found: 13.90% $OCH_3$, 46.36% Cl.

*Example 6*

3 grams dimethyl ester of 1,4-endomethylene–$\Delta^5$–cyclohexene–2,3–trans–dicarboxylic acid are dissolved with stirring in 97 grams alcohol. The solution is used as a spray for rooms.

*Example 7*

4.5 grams dimethyl ester of 1,4,5,6,7,7-hexachloro-1,4-endomethylene-$\Delta^5$-cyclohexene-2,3-trans-dicarboxylic acid are finely divided in 92.5 grams kaolin and 3 grams of a lignosulfonic acid preparation are added as an adhesive. All ingredients are homogeneously mixed. The product may be used as a dusting agent.

*Example 8*

70 grams dimethyl ester of 1,4,5,6,7,7-hexachloro-1,4-endomethylene-$\Delta^5$-cyclohexene-2,3-trans-dicarboxylic acid are finely divided in 20 grams diatomaceous earth and 10 grams of the same adhesive as in Example 7 are added. Homogeneous mixing results in a concentrate for a dusting agent.

What is claimed is:

1. A process of preparing a lower alkyl ester of 1,4-endoalkylene-$\Delta^5$-cyclohexene-2,3-trans-dicarboxylic acid which comprises reacting a lower alkyl fumarate with a cycloalkadiene monomer selected from the group consisting of cyclopentadiene, hexachloropentadiene, a mixture of tetrachlorocyclopentadiene and pentachlorocyclopentadiene, and cyclohexa-1,3-diene, at normal pressure and a temperature not exceeding the boiling point of the cycloalkadiene monomer.

2. A process as claimed in claim 1, wherein said lower alkylfumarate is dimethyl fumarate.

3. A process as claimed in claim 1, wherein the lower alkylfumarate is diethyl fumarate.

References Cited by the Examiner

UNITED STATES PATENTS 2,471,790  5/1949  Sowa et al. _____ 260—468 X
2,812,347  11/1957  Newcomer et al. _____ 260—468
2,850,523  9/1958  Dazzi _____ 260—468

OTHER REFERENCES

Blomquist et al.: "J. Org. Chem.," vol. 10 (1945), pp. 149–158.

Martin et al.: "Chem. Rev." vol. 61 (1961, pp. 537–562.

LORRAINE A. WEINBERGER, *Primary Examiner.*

HAROLD G. MOORE, *Examiner.*